US011283123B2

(12) United States Patent
Gu et al.

(10) Patent No.: US 11,283,123 B2
(45) Date of Patent: Mar. 22, 2022

(54) BATTERY PACK COOLING SYSTEM AND BATTERY PACK

(71) Applicant: CONTEMPORARY AMPEREX TECHNOLOGY CO., LIMITED, Fujian (CN)

(72) Inventors: Yanlong Gu, Fujian (CN); Xiaoteng Huang, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/133,564

(22) Filed: Dec. 23, 2020

(65) Prior Publication Data

US 2021/0119281 A1    Apr. 22, 2021

Related U.S. Application Data

(63) Continuation of application No. PCT/CN2019/119254, filed on Nov. 18, 2019.

(30) Foreign Application Priority Data

Nov. 20, 2018  (CN) .......................... 201821910573.8

(51) Int. Cl.
*H01M 10/613* (2014.01)
*H01M 10/6567* (2014.01)
(Continued)

(52) U.S. Cl.
CPC ..... *H01M 10/6557* (2015.04); *H01M 10/613* (2015.04); *H01M 10/6552* (2015.04); *H01M 10/6567* (2015.04); *H01M 50/204* (2021.01)

(58) Field of Classification Search
CPC .......... H01M 10/613; H01M 10/6556; H01M 10/0568; H01M 10/625; H01M 10/6552;
(Continued)

(56) References Cited

U.S. PATENT DOCUMENTS

| | | | |
|---|---|---|---|
| 9,989,317 B2 | 6/2018 | Katoh | |
| 2007/0062681 A1* | 3/2007 | Beech | F28F 9/0246 165/170 |

(Continued)

FOREIGN PATENT DOCUMENTS

| | | |
|---|---|---|
| CN | 204558620 U | 8/2015 |
| CN | 104884892 A | 9/2015 |

(Continued)

*Primary Examiner* — Stewart A Fraser
*Assistant Examiner* — Lilia Nedialkova
(74) *Attorney, Agent, or Firm* — Scully Scott Murphy & Presser

(57) ABSTRACT

Disclosed are a battery pack cooling system and a battery pack. The battery pack cooling system includes: a cooling pipeline, which is provided inside the battery pack, provided with an inlet and an outlet, and configured to cool a battery module; an inlet connecting pipe, which extends into the battery pack and is connected to the inlet, and is provided with a first fool-proofing structure; and an outlet connecting pipe, which extends into the battery pack and is connected to the outlet, and is provided with a second fool-proofing structure, the second fool-proofing structure being different from the first fool-proofing structure.

14 Claims, 5 Drawing Sheets

(51) Int. Cl.
*H01M 50/204* (2021.01)
*H01M 10/6557* (2014.01)
*H01M 10/6552* (2014.01)

(58) Field of Classification Search
CPC ......... H01M 10/6554; H01M 10/6557; H01M 10/6567; H01M 10/6568; H01M 50/20; H01M 50/204; Y02E 60/10
See application file for complete search history.

(56) References Cited

U.S. PATENT DOCUMENTS

| | | |
|---|---|---|
| 2015/0030902 A1 | 1/2015 | Nagano et al. |
| 2015/0338173 A1 | 11/2015 | Katoh |
| 2016/0049705 A1 | 2/2016 | Mahe et al. |
| 2016/0248133 A1* | 8/2016 | Iqbal .................. H01M 10/6568 |
| 2016/0268657 A1* | 9/2016 | Park .................... H01M 10/613 |
| 2018/0212285 A1 | 7/2018 | Huang et al. |

FOREIGN PATENT DOCUMENTS

| | | |
|---|---|---|
| CN | 107069142 A | 8/2017 |
| CN | 207558861 U | 6/2018 |
| CN | 108346839 A | 7/2018 |
| CN | 209016205 U | 6/2019 |
| EP | 2602141 A1 | 6/2013 |
| EP | 2830123 A2 | 1/2015 |
| JP | 2017215057 A | 12/2017 |

* cited by examiner

BATTERY PACK COOLING SYSTEM AND BATTERY PACK

CROSS-REFERENCE TO RELATED APPLICATIONS

This application is a continuation of International Application No. PCT/CN2019/119254, filed on Nov. 18, 2019, which claims priority to Chinese Patent Application No. 201821910573.8, filed on Nov. 20, 2018. The disclosures of the aforementioned applications are hereby incorporated by reference in their entireties.

TECHNICAL FIELD

Some embodiments of the present application relate to the technical field of battery modules, and in particular to a structure of a cooling system in a battery pack.

BACKGROUND

Since a battery would generate a large amount of heat during working, cooling system is usually provided in battery pack in order to maintain the stable internal temperature of the battery pack. Existing battery pack cooling system is water cooling system and include cooling pipeline provided in the battery pack, and cooling liquid circulates in the cooling pipeline. The cooling liquid exchanges heat with the battery module in the battery pack and then flows to the outside of the battery pack for cooling, so that the heat in the battery pack is diffused to the outside of the battery pack, and then the cooled cooling liquid flows into the battery pack from inlets of the cooling pipeline for recycling.

SUMMARY

In view of this, some embodiments of the present application aim at providing a battery pack cooling system, which is used for solving a technical problem in the prior art of an inlet and an outlet of a battery pack cooling pipeline being prone to wrong connection, resulting in a reverse flowing direction of a cooling liquid, which affects the cooling or heating uniformity of a battery module in a battery pack.

Some embodiments of the present application provide a battery pack cooling system, including: a cooling pipeline provided inside a battery pack, the cooling pipeline being provided with an inlet and an outlet and configured to cool a battery module;

an inlet connecting pipe, which extends into the battery pack and is connected to the inlet, and is provided with a first fool-proofing structure; and an outlet connecting pipe, which extends into the battery pack and is connected to the outlet, and is provided with a second fool-proofing structure, the second fool-proofing structure being different from the first fool-proofing structure.

In some embodiments, the first fool-proofing structure includes a first matching member, a surface of the battery pack is provided with a first assembly hole adapted to the first matching member, and the first matching member is assembled in the first assembly hole; and the second fool-proofing structure includes a second matching member, the surface of the battery pack is provided with a second assembly hole adapted to the second matching member, and the second matching member is assembled in the second assembly hole.

In some embodiments, the first matching member is fixed to an outer wall of the inlet connecting pipe and is connected to the battery pack via a fixing member; and the second matching member is fixed to an outer wall of the outlet connecting pipe and is connected to the battery pack via a fixing member.

In some embodiments, the first matching member and the second matching member each include an oval disk and a protrusion, the protrusion being provided on a side face of the oval disk; and positions of the protrusions of the first matching member and the second matching member on the respective oval disks are different. The first matching member and the second matching member use a combined structure of the oval disk and the protrusion so as to achieve a fool-proofing effect while facilitating processing and assembly.

In some embodiments, an outer side of the first assembly hole is provided with a cover plate and a dust-proof pad, the dust-proof pad being provided between the cover plate and the first assembly hole, and the inlet connecting pipe passing through the cover plate and the dust-proof pad and being connected to the inlet; and an outer side of the second assembly hole is provided with a cover plate and a dust-proof pad, the dust-proof pad being provided between the cover plate and the second assembly hole, and the outlet connecting pipe passing through the cover plate and the dust-proof pad and being connected to the outlet. The dust-proof pads are arranged in the first assembly hole and the second assembly hole so as to prevent fine particles such as powder in air from entering the battery pack.

In some embodiments, a nonmetal protective pad is provided between each of the outer wall of the inlet connecting pipe and the outer wall of the outlet connecting pipe and the respective cover plate. Contacts between the cover plates and the respective inlet connecting pipe and outlet connecting pipe are prevented by the two protective pads, thereby preventing the occurrence of an electrochemical reaction.

In some embodiments, the first matching member includes a first oval disk and a first protrusion; the second matching member includes a second oval disk and a second protrusion, the second protrusion being provided on a side face of the second oval disk; and a position of the first protrusion on the first oval disk is different from a position of the second protrusion on the second oval disk.

In some embodiments, an outer side of the first assembly hole is provided with a first cover plate and a first dust-proof pad, the first dust-proof pad being provided between the first cover plate and the first assembly hole, and the inlet connecting pipe passing through the first cover plate and the first dust-proof pad and being connected to the inlet; and an outer side of the second assembly hole is provided with a second cover plate and a second dust-proof pad, the second dust-proof pad being provided between the second cover plate and the second assembly hole, and the outlet connecting pipe passing through the second cover plate and the second dust-proof pad and being connected to the outlet.

In some embodiments, a first nonmetal protective pad is provided between an outer wall of the inlet connecting pipe and the first cover plate; and a second nonmetal protective pad is provided between an outer wall of the outlet connecting pipe and the second cover plate. Contacts between the cover plates and the respective inlet connecting pipe and outlet connecting pipe are prevented by the two nonmetal protective pads, thereby preventing the occurrence of an electrochemical reaction.

In some embodiments, a sealing component is provided between the first matching member and the first assembly hole; and a sealing component is provided between the second matching member and the second assembly hole. The sealing components may fill a gap between the first matching member and the first assembly hole and a gap between the second matching member and the second assembly hole, thereby achieving a waterproof effect.

In some embodiments, one end of the inlet connecting pipe or the outlet connecting pipe is provided with a first connector, the first connector being configured to be connected to the inlet or the outlet, and the other end of the inlet connecting pipe or the outlet connecting pipe is provided with a second connector, an outer wall of the second connector being provided with a first rib protruding toward an outer side thereof; and circumferential positions of the first rib of the inlet connecting pipe and the first rib of the outlet connecting pipe on the outer wall of the second connector are different. Therefore, the second connector of the inlet connecting pipe can only be connected to one end of a pipeline outside the battery pack, and the second connector of the outlet connecting pipe can only be connected to the other end of the pipeline outside the battery pack, thereby achieving a fool-proof effect.

In some embodiments, one end of the inlet connecting pipe is provided with a first connector, the first connector being configured to be connected to the inlet, and the other end of the inlet connecting pipe is provided with a second connector, an outer wall of the second connector being provided with a first rib protruding towards an outer side thereof.

In some embodiments, one end of the outlet connecting pipe is provided with a first connector, the first connector being configured to be connected to the outlet, and the other end of the outlet connecting pipe is provided with a second connector, an outer wall of the second connector being provided with a first rib protruding towards an outer side thereof.

In some embodiments, a position of the first rib on one of the second connectors and a position of the first rib on the other one of the second connectors are different. Therefore, the second connector of the inlet connecting pipe can only be connected to one end of a pipeline outside the battery pack, and the second connector of the outlet connecting pipe can only be connected to the other end of the pipeline outside the battery pack, thereby achieving a fool-proof effect.

In some embodiments, the outer wall of the second connector of the inlet connecting pipe or the outlet connecting pipe is further provided with a second rib; and circumferential positions of the second rib of the inlet connecting pipe and the second rib of the outlet connecting pipe on the outer wall of the second connector are different. The second rib and the first rib cooperate with each other so as to further achieve a fool-proofing effect.

In some embodiments, the outer wall of the second connector of the inlet connecting pipe is further provided with a second rib.

In some embodiments, the outer wall of the second connector of the outlet connecting pipe is further provided with a second rib.

In some embodiments, a position of the second rib on one of the second connectors and a position of the second rib on the other one of the second connectors are different. The second rib and the first rib cooperate with each other so as to further achieve a fool-proofing effect.

Some embodiments of the present application further provide a battery pack, including:
two or more battery modules; and
a cooling system configured to cool the battery modules, the cooling system being a battery pack cooling system according to any one of the above technical solutions.

Different from the prior art, according to the above technical solution, the inlet connecting pipe and the outlet connecting pipe of the cooling pipeline of the battery pack are provided with different fool-proofing structures, so that the inlet connecting pipe cannot be connected to the outlet of the cooling pipeline, and the outlet connecting pipe cannot be connected to the inlet of the cooling pipeline, thereby effectively avoiding the situation where a cooling liquid reversely flows in the battery pack due to the wrong connection of the inlet and the outlet of the cooling pipeline, and effectively ensuring the heat dissipation uniformity of all the battery modules in the battery pack.

LIST OF REFERENCE SIGNS

Figure 1A:
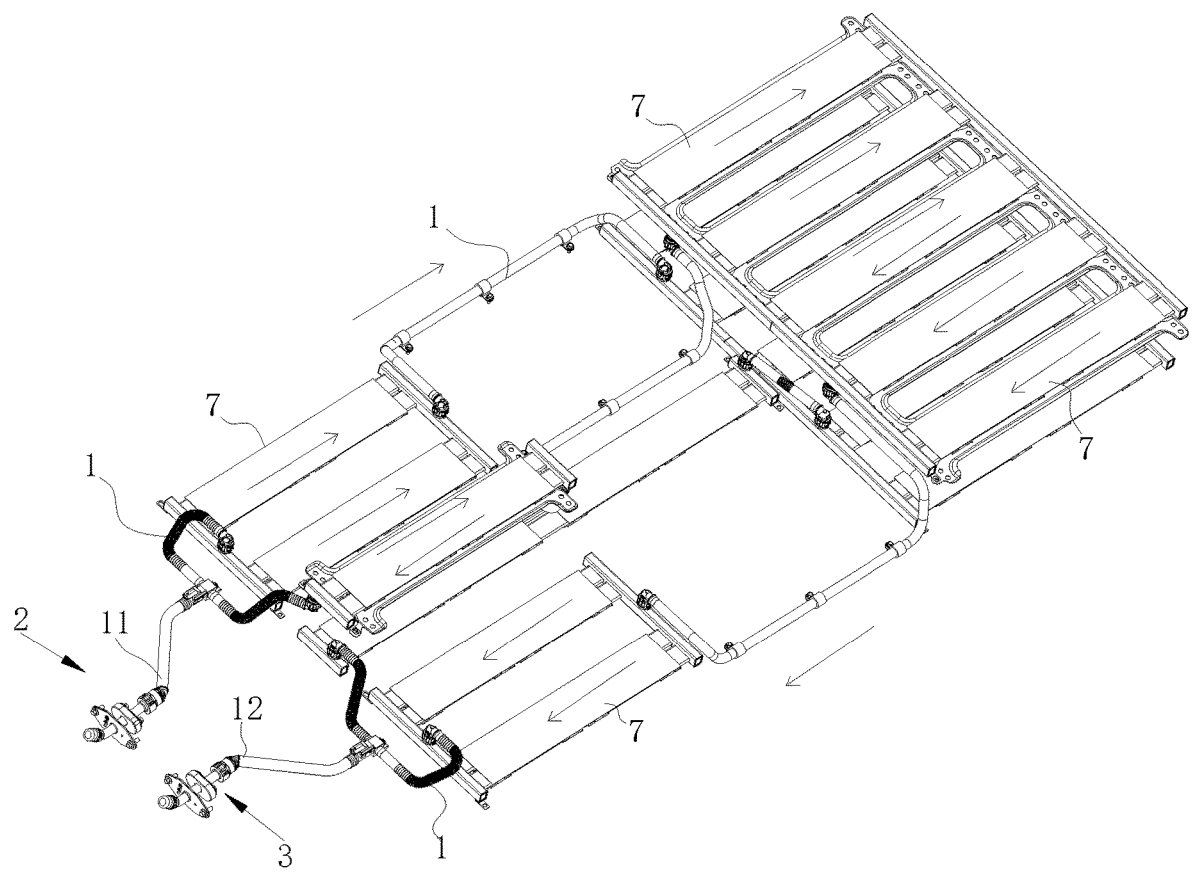
FIG. 1a is a schematic structural diagram of a battery pack cooling system.

1, Cooling pipeline;
11, Inlet;
12, Outlet;
2, Inlet connecting assembly;
21, Inlet connecting pipe;
211, First connector;
212, Second connector;
212a, First rib;
212b, Second rib;
22, First matching member;
221, First protrusion;
222, First oval disk;
23, First cover plate;
231, Fixing hole;
232, First dust-proof pad;
24, First sealing component;
25, First nonmetal protective pad;
26, Dust-proof cover;
3, Outlet connecting assembly;
31, Outlet connecting pipe;
311, First connector;
312, Second connector;
312a, First rib;
312b, Second rib;
32, Second matching member;
321, Second protrusion;
322, Second oval disk;
33, Second cover plate;

331, Fixing hole;
332, Second dust-proof pad;
35, Second nonmetal protective pad;
4, Case;
41, First assembly hole;
411, First avoidance recess;
42, Second assembly hole;
421, Second avoidance recess;
43a, Fixing hole;
43b, Fixing hole;
44a, Fixing hole;
44b, Fixing hole;
45, First through hole;
46, Second through hole;
5, Bolt;
6, Third connector;
7, Support face;
8, Battery module;

DESCRIPTION OF EMBODIMENTS

In order to describe the technical contents, structural features, achieved objectives and effects of the technical solution in detail, the following detailed description will be given in conjunction with specific embodiments and accompanying drawings.

It is to be noted that in the description of the embodiments of the present application, unless clearly specified and defined otherwise, the terms "first" and "second" are only used for descriptive purposes, and cannot be construed as indicating or implying relative importance; unless specified or stated otherwise, the term "plurality" means two or more; and the terms "connection", "fixing", etc. should be understood in a broad sense, for example, "connection" may be a fixed connection, a detachable connection, an integral connection, or an electrical connection, and may be a direct connection or an indirect connection via an intermediate medium. For those of ordinary skill in the art, the specific meaning of the terms mentioned above in the present disclosure should be construed according to specific circumstances.

In the description of the description, it is to be understood that the orientation terms such as "upper", "lower", "left" and "right" described in the various embodiments of the present application are described from the angle shown in the accompanying drawings, and should not be construed as limiting the various embodiments of the present application. In addition, in the context, it also needs to be understood that when it is mentioned that an element is connected to an "upper" or "lower" portion of another element, it can not only be directly connected to the "upper" or "lower" portion of the another element, but also indirectly connected to the "upper" or "lower" portion of the another element via an intermediate element.

At present, in order to ensure the uniformity of cooling of the interior of the battery pack and prevent poor local cooling of the interior of the battery pack, the flow rate of the cooling liquid in the battery pack needs to be distributed according to the layout of the battery modules. That is, the flow rate of the cooling liquid is distributed according to the amount of heat generated, and the more concentrated distribution of the battery modules is, the flow rate of the cooling liquid is increased correspondingly. However, the shapes and structures of the battery packs are various, and the distribution of the battery modules in the battery packs is also uneven, so that the distribution of a cooling pipeline and the cooling liquid of a cooling system is uneven, and an inlet and an outlet of the cooling pipeline also need to be distinguished.

Similarly, when the ambient temperature is low, the cooling liquid needs to flow into the battery pack to heat the battery modules in the battery pack, and the cooling liquid also needs to be distributed in the battery pack according to the layout of the battery modules, thereby reducing a temperature difference between the different battery modules.

In the prior art, the inlet and the outlet of the cooling pipeline are distinguished mainly by adding corresponding marks. In actual production, there is still a situation where the inlet and outlet of the cooling pipe are connected incorrectly, resulting in a reverse flowing direction of the cooling liquid in the cooling pipeline, which affects the cooling or heating uniformity of the battery module in the battery pack.

On the basis of this, referring to FIGS. 1a and 1b to FIG. 6, some embodiments of the present application provide a battery pack cooling system.

As shown in FIG. 1a, the battery pack cooling system includes a cooling pipeline 1, an inlet connecting assembly 2 and an outlet connecting assembly 3.

Figure 1B:
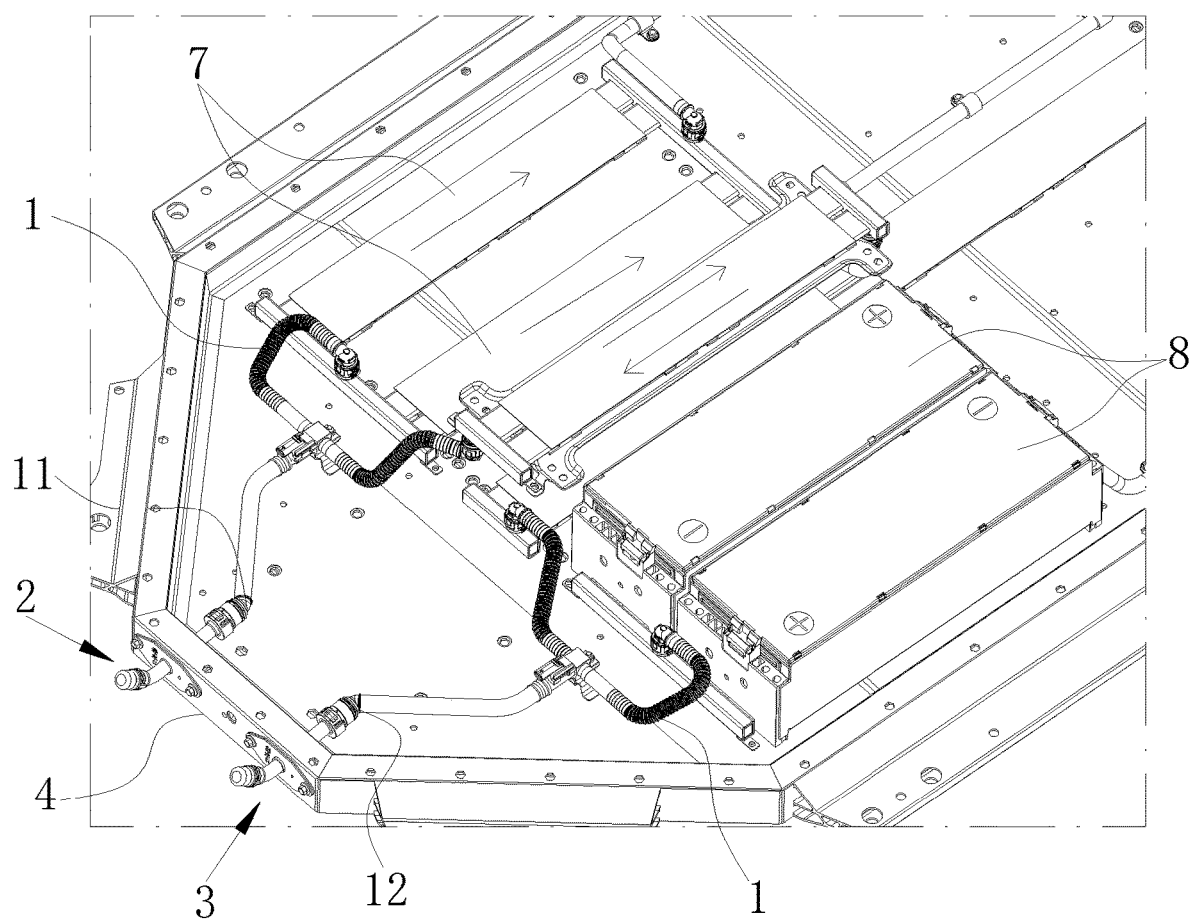
FIG. 1b is a schematic structural diagram of an interior of a battery pack.

The cooling pipeline 1 is provided in the battery pack, and a cooling liquid circulates in the cooling pipeline 1 for cooling a battery module 8 in the battery pack. As shown in FIGS. 1a and 1b, at least part of the cooling pipeline 1 may be provided on a support face 7 of the battery pack, and the support face 7 may be provided with the battery module 8, such that heat transfer is conducted between the support face 7 and the battery module 8 provided on the support face 7, to transfer heat from the battery module 8 to the cooling pipeline 1.

The cooling pipeline 1 may be formed by connecting a plurality of segments of pipeline in series or in parallel, so that the flow rate of the cooling liquid may be distributed rationally for cooling all the battery modules 8 in the battery pack. One end of the cooling pipeline 1 is provided with an inlet 11 for allowing the cooling liquid to flow into same, and the other end of the cooling pipeline 1 is provided with an outlet 12 for allowing the cooling liquid to flow out of same. As shown in FIG. 1b, the inlet connecting assembly 2 and the outlet connecting assembly 3 are fixed to a case 4 of the battery pack, where the inlet connecting assembly 2 is configured to be connected to the inlet 11, and the outlet connecting assembly 3 is configured to be connected to the outlet 12, so that the cooling pipeline 1 is connected to a pipeline outside the battery pack.

Figure 2:
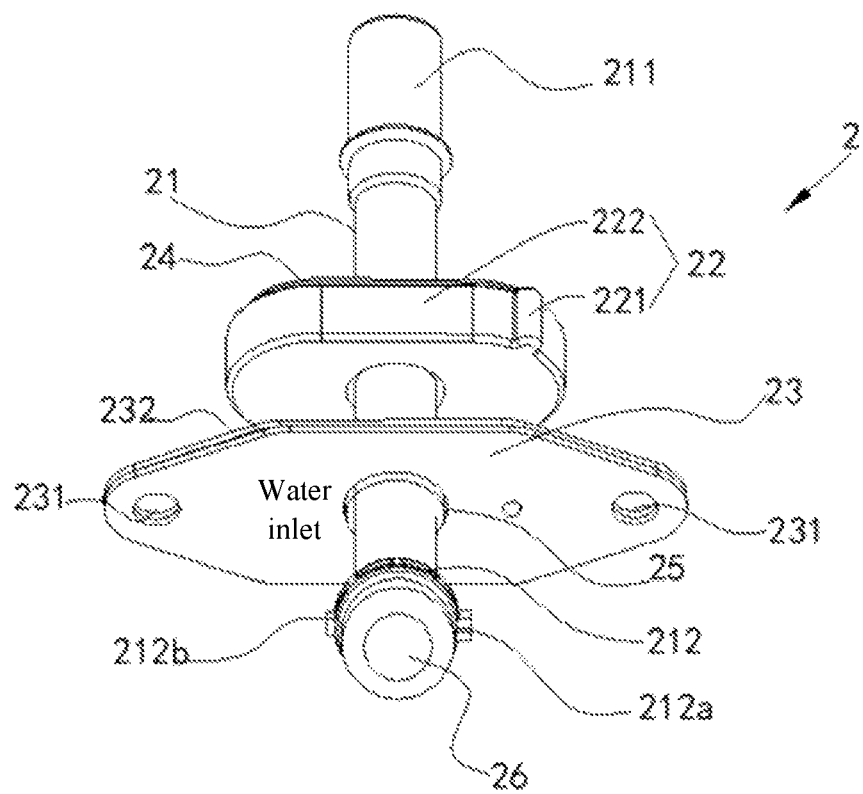
FIG. 2 is a schematic structural diagram of an inlet connecting assembly.
Figure 3:
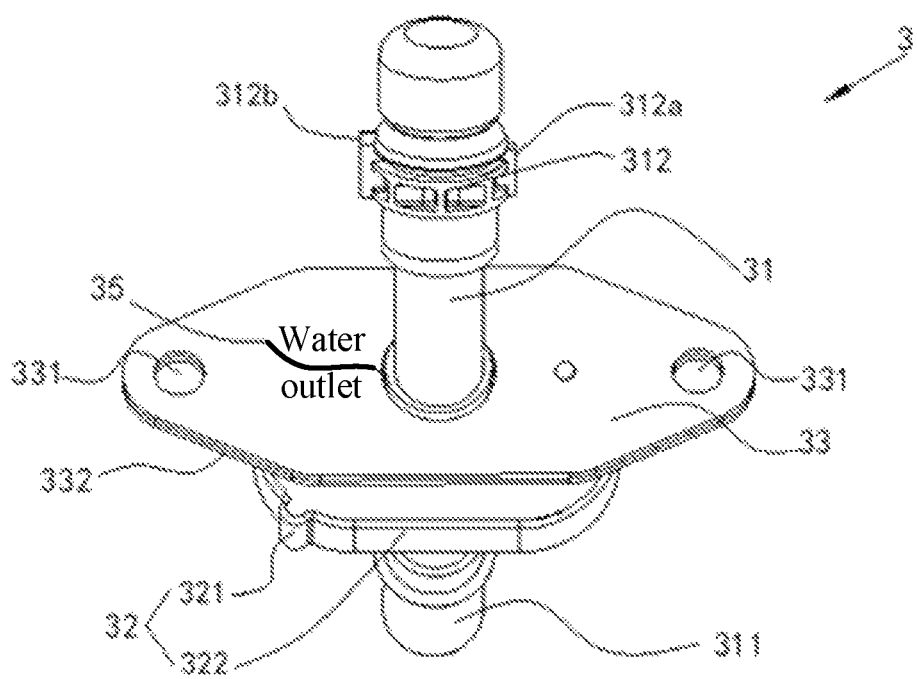
FIG. 3 is a schematic structural diagram of an outlet connecting assembly.

In addition, as shown in FIGS. 2 and 3, the inlet connecting assembly 2 includes an inlet connecting pipe 21 and a first fool-proofing structure, and the outlet connecting assembly 3 includes an outlet connecting pipe 31 and a second fool-proofing structure. As shown in FIGS. 1b, 2 and 3, one end of the inlet connecting pipe 21 extends from the outside of the battery pack into the battery pack and is connected to the inlet 11 at one end of the cooling pipeline 1. The outlet connecting pipe 31 extends from the outside of the battery pack into the battery pack and is connected to the outlet 12 at the other end of the cooling pipeline 1.

The first fool-proofing structure and the second fool-proofing structure are configured to prevent the inlet connecting pipe 21 and the outlet connecting pipe 31 from being wrongly connected to the inlet 11 and the outlet 12 of the cooling pipeline 1 respectively, that is, to prevent the inlet connecting pipe 21 from being connected to the outlet 12, and also prevent the outlet connecting pipe 31 from being connected to the inlet 11. The first fool-proofing structure and the second fool-proofing structure are different in structure, and the first fool-proofing structure enables the inlet connecting pipe 21 to be connected to only the inlet 11 of the cooling pipeline 1 but not to the outlet 12 of the cooling pipeline 1; and similarly, the second fool-proofing structure enables the outlet connecting pipe 31 to be connected to only the outlet 12 of the cooling pipeline 1 but not to the inlet 11 of the cooling pipeline 1.

As shown in FIGS. 2 and 3, the first fool-proofing structure includes a first matching member 22, and the second fool-proofing structure includes a second matching member 32, the first matching member 22 and the second matching member 32 being different in shape.

Figure 4:
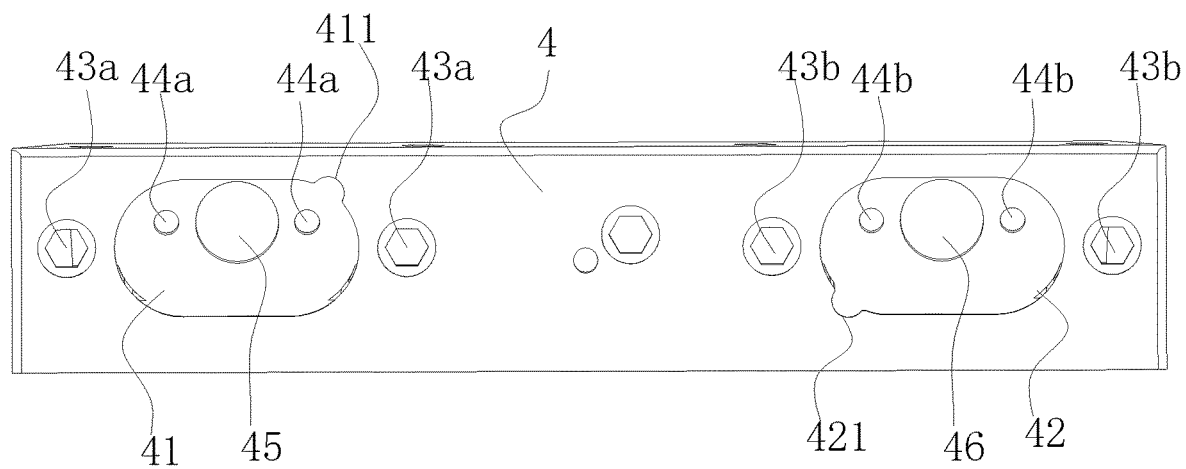
FIG. 4 is a schematic diagram of a wall of a case of the battery pack.

A schematic diagram of an outer wall of the case 4 of the battery pack is shown in FIG. 4, which is connected to an inlet connecting assembly 2 and an outlet connecting assembly 3. The case 4 of the battery pack is provided with a first assembly hole 41 adapted to the first matching member 22 and a second assembly hole 42 adapted to the second matching member 32.

The inlet connecting pipe 21 extends into the battery pack from the first assembly hole 41 and is then connected to the inlet 11 of the cooling pipeline 1, and the first matching member 22 is assembled in the first assembly hole 41; and similarly, the outlet connecting pipe 31 extends into the battery pack from the second assembly hole 42 and is then connected to the outlet 12 of the cooling pipeline 1, and the second matching member 32 is assembled in the second assembly hole 42.

The first matching member 22 and the second matching member 32 are different in shape, and the first assembly hole 41 is adapted to the first matching member 22 and the second assembly hole 42 is adapted to the second matching member 32. Therefore, when the inlet connecting pipe 21 is wrongly connected to the outlet 12 of the cooling pipeline 1, the first matching member 22 is not adapted to the second assembly hole 42, resulting in unsuccessful assembly; and similarly, when the outlet connecting pipe 31 is wrongly connected to the inlet 11 of the cooling pipeline 1, the second matching member 32 cannot be assembled in the first assembly hole 41, so as to achieve a fool-proofing effect.

As shown in FIGS. 2 to 4, in the embodiment, the first matching member 22 includes a first oval disk 222 and a first protrusion 221 provided on a side face of the first oval disk 222, and the second matching member 32 respectively includes a second oval disk 322 and a second protrusion 321 provided on a side face of the second oval disk 322. However, a position of the first protrusion 221 of the first matching member 22 on the first oval disk 222 is different from a position of the second protrusion 321 of the second matching member 32 on the second oval disk 322.

As shown in FIG. 4, cross sections of the first assembly hole 41 and the second assembly hole 42 are elliptical holes, and a periphery of the first assembly hole 41 is provided with a first avoidance recess 411 corresponding to the first protrusion 221 and a periphery of the second assembly hole 42 is provided with a second avoidance recess 421 corresponding to the second protrusion 321. In this way, the first matching member 22 cannot be assembled in the second assembly hole 42, and the second matching member 32 cannot be assembled in the first assembly hole 41. The first matching member 22 and the second matching member 32 use a combined structure of the oval disk and the protrusion so as to achieve a fool-proofing effect while facilitating processing and assembly.

In some embodiments, the first matching member 22 and the second matching member 32 may be of plate-like, columnar or block-like structures having another different profile, and a first assembly hole 41 and a second assembly hole 42 are openings having corresponding cross-sectional shapes, provided that the first matching member 22 can be assembled into the first assembly hole 41 but cannot be assembled into the second assembly hole 42, and the second matching member 32 can be assembled into the second assembly hole 42 but cannot be assembled into the first assembly hole 41.

In some other embodiments, a plate-shaped, columnar or block-shaped structure may be also added to the case 4 of the battery pack, and openings with corresponding cross sections or avoidance structures are provided on the inlet connecting assembly 2 and the outlet connecting assembly 3.

As shown in FIGS. 2 and 3, a tail end of the inlet connecting pipe 21 is arranged to pass through the first matching member 22, such that the tail end of the inlet connecting pipe 21 extends from the case 4 of the battery pack into the battery pack. The first matching member 22 may be fixed to an outer wall of the inlet connecting pipe 21, that is, the first matching member 22 and the outer wall of the inlet connecting pipe 21 are immobilized.

As shown in FIG. 4, the first assembly hole 41 on the case 4 of the battery pack is further internally provided with fixing holes 44a and a first through hole 45, where the first through hole 45 is configured to allow the inlet connecting pipe 21 to pass through, and the fixing holes 44a are configured to fix the first matching member 22. That is, the first matching member 22 is fixed to the outer wall of the inlet connecting pipe 21 and assembled into the first assembly hole 41, and then may be fixed into the fixing holes 44a via fixing members such as bolts, such that the inlet connecting pipe 21 and the case 4 of the battery pack are fixedly connected, thereby improving the connection strength of the inlet connecting pipe 21.

Similarly, as shown in FIG. 4, the second assembly hole 42 on the case 4 of the battery pack is further internally provided with fixing holes 44b and a second through hole 46, where the second through hole 46 is configured to allow the outlet connecting pipe 31 to pass through, and the second matching member 32 is assembled into the second assembly hole 42 and then may be fixed to the fixing holes 44b via fixing members such as bolts, such that the outlet connecting pipe 31 and the case 4 of the battery pack are fixedly connected.

As shown in FIGS. 2 and 3, in order to ensure the waterproof level of the battery pack, an inner side of the first matching member 22 may be further provided with a first sealing component 24, and the first sealing component 24 is provided between the first matching member 22 and the first assembly hole 41. Similarly, a second sealing component (not shown in FIG. 3) is provided between the second matching member 32 and the second assembly hole 42. Both the first sealing component 24 and the second sealing component may be sealing pads or sealing rings made of a sealing material such as rubber or silica gel, so that the first sealing component 24 and the second sealing component have a certain elasticity. When the first matching member 22 and the second matching member 32 are assembled into the first assembly hole 41 and the second assembly hole 42 respectively, the first sealing component 24 may fill a gap between the first matching member 22 and the first assembly hole 41, and the second sealing component may fill a gap between the second matching member and the second assembly hole 42, thereby achieving a waterproof effect.

As shown in FIG. 2, the inlet connecting assembly 2 further includes a first cover plate 23 and a first dust-proof pad 232, and the inlet connecting pipe 21 passes through the first cover plate 23 and the first dust-proof pad 232 into the battery pack. The first cover plate 23 may be made of a plate such as a stainless steel plate and an aluminum alloy plate. The first cover plate 23 and the first dust-proof pad 232 are provided at an outer side of the first matching member 22, and the first cover plate 23 is located on an outer surface of the case 4 of the battery pack to cover the first assembly hole 41. The first dust-proof pad 232 is provided between the first cover plate 23 and the first assembly hole 41 (i.e., a surface of the assembly hole), so as to prevent fine particles such as powder in air from entering the battery pack. As shown in FIGS. 2 and 4, in order to fix the first cover plate 23 to the case 4 of the battery pack, the first cover plate 23 is provided with fixing holes 231, and two sides of the first assembly hole 41 on the case 4 of the battery pack are provided with corresponding fixing holes 43a. Therefore, the first cover plate 23 may be fixed to the case 4 of the battery pack via fixing members such as bolts.

Figure 5:
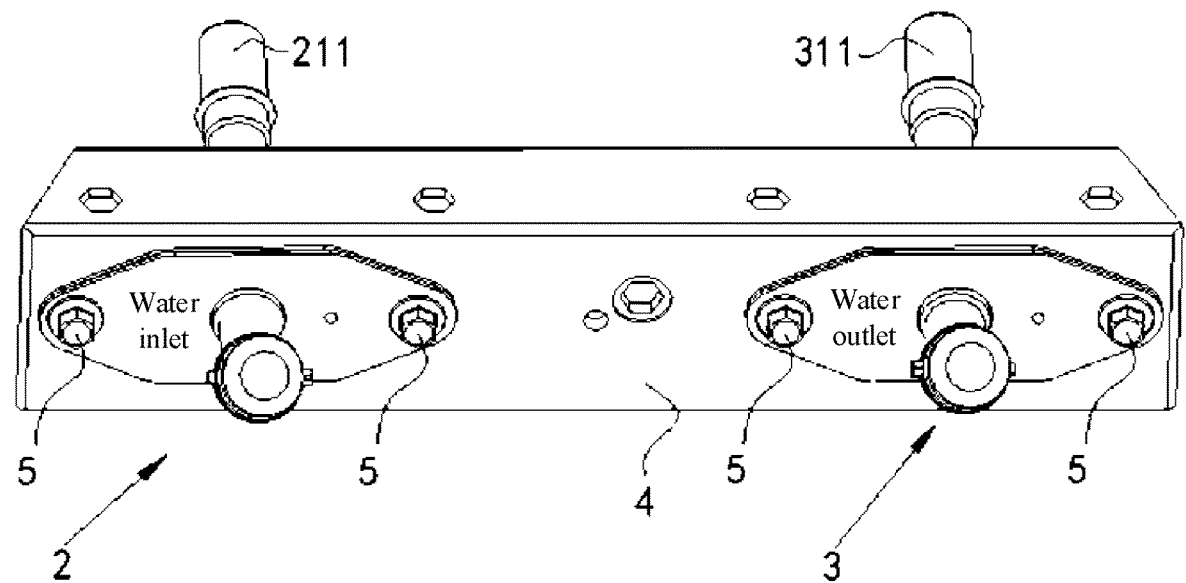
FIG. 5 is a schematic diagram with the inlet connecting assembly and the outlet connecting assembly being connected to the case of the battery pack.

Similarly, as shown in FIGS. 3 and 4, the outlet connecting assembly 3 is further provided with a second cover plate 33 and a second dust-proof pad 332, where in order to fix the second cover plate 33, the second cover plate 33 is provided with fixing holes 331, and the case 4 of the battery pack is provided with corresponding fixing holes 43b. A schematic diagram of the inlet connecting assembly 2 and the outlet connecting assembly 3 is shown in FIG. 5, which are mounted on the case 4 of the battery pack.

In addition, in some embodiments, in order to identify the inlet connecting assembly 2 and the outlet connecting assembly 3 conveniently, corresponding identification words such as "water inlet" or "water outlet" may be provided on the first cover plate 23 and the second cover plate 33.

Considering that the first cover plate 23 and the second cover plate 33 have a different material from the inlet connecting pipe 21 and the outlet connecting pipe 31, they may electrochemically react with each other due to long-time contact. Therefore, in order to prevent the electrochemical reaction, as shown in FIG. 2, a first nonmetal protective pad 25 made of a nonmetal material is provided between the outer wall of the inlet connecting pipe 21 and the first cover plate 23, and as shown in FIG. 3, a second nonmetal protective pad 35 made of a nonmetal material is provided between the outer wall of the outlet connecting pipe 31 and the second cover plate 33. The first cover plate 23 is separated from the inlet connecting pipe 21 by the first nonmetal protective pad 25, and contact between the second cover plate 33 and the outlet connecting pipe 31 is prevented by the second nonmetal protective pad 35, thereby preventing the occurrence of the electrochemical reaction.

Figure 6:
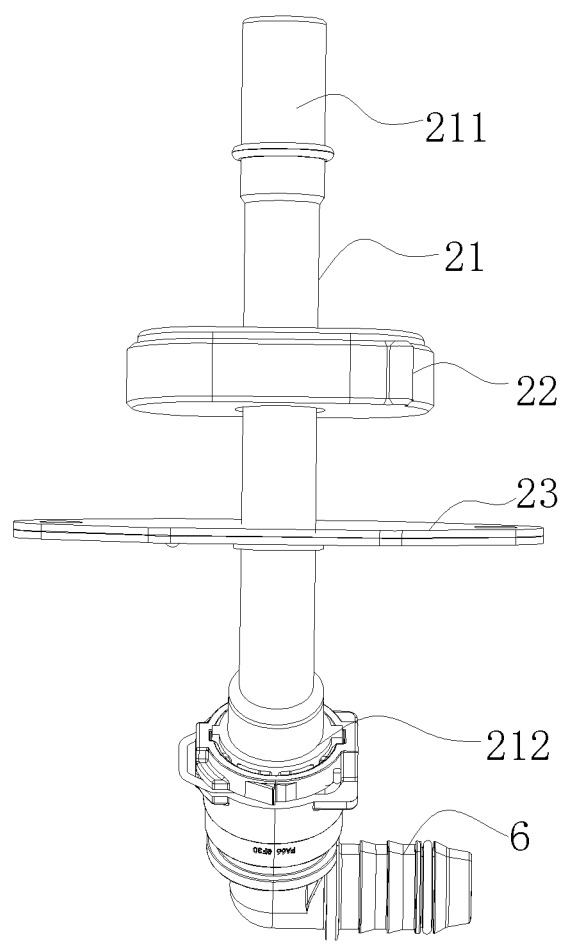
FIG. 6 is a schematic diagram with the inlet connecting assembly being connected to an external pipeline connector.

As shown in FIGS. 2 and 3, one end, extending into the battery pack, of the inlet connecting pipe 21 is provided with a first connector 211, the first connector 211 being configured to be connected to the outlet 11, and the other end of the inlet connecting pipe 21 is provided with a second connector 212, the second connector 212 being configured to be connected to a pipeline outside the battery pack. As shown in FIG. 6, a second connector 212 may be connected to a third connector 6. The third connector 6b is a connector connected to the pipeline outside the battery pack. In order to prevent powder from entering the inlet connecting pipe 21, a tail end of the second connector 212 may be provided with a temporarily used dust-proof cover 26, and the dust-proof cover 26 is removed when the inlet connecting pipe 21 is connected to the pipeline outside the battery pack.

Similarly, as shown in FIG. 3, one end, extending into the battery pack, of the outlet connecting pipe 31 is provided with a first connector 311, and the other end thereof is provided with a second connector 312, the second connector 312 being configured to be connected to a pipeline outside the battery pack.

In order to prevent the second connector 212 on the inlet connecting pipe 21 and the second connector 312 on the outlet connecting pipe 31 from being wrongly connected to the pipeline outside the battery pack, an outer wall of the second connector 212 of the inlet connecting pipe 21 is provided with a first rib 212a protruding toward an outer side thereof, and an interface of the pipeline outside the battery pack is provided with a recess matching the first rib 212a. Similarly, an outer wall of the second connector 312 of the outlet connecting pipe 31 is provided with a first rib 312a, and an interface of the other end of the pipeline outside the battery pack is provided with a recess matching the first rib 312a. A circumferential position of the first rib 212a of the inlet connecting pipe 21 on the outer wall of the second connector 212 is different from a circumferential position of the first rib 312a of the outlet connecting pipe 31 on the outer wall of the second connector 312 (in some embodiments, to be arranged in a mirror image manner), and therefore, the second connector 212 of the inlet connecting pipe 21 can be connected to only one end of the pipeline outside the battery pack, and the second connector 312 of the outlet connecting pipe 31 can be connected to only the other end of the pipeline outside the battery pack, thereby achieving a fool-proof effect.

Furthermore, in some embodiments, as shown in FIGS. 2 and 3, the second connector 212 of the inlet connecting pipe 21 is further provided with a second rib 212b, the second rib 212b and the first rib 212a are arranged at different positions of an outer periphery of the second connector 212, and the second rib 212b and the first rib 212a cooperate with each other to achieve the fool-proofing effect.

Similarly, the second connector 312 of the outlet connecting pipe 31 is further provided with a second rib 312b, the second rib 312b and the first rib 312a are provided at different positions of an outer periphery of the second connector 312, and the second rib 312b and the first rib 312a cooperate with each other to achieve the fool-proofing effect.

Moreover, in some embodiments, as shown in FIGS. 2 and 3, a circumferential position of the second rib 212b on the outer wall of the second connector 212 is different from a circumferential position of the second rib 312b on the outer wall of the second connector 312. Therefore, the fool-proofing effect is further achieved.

Some embodiments of the present application further provide an embodiment of a battery pack. The battery pack includes two or more battery modules 8 and a cooling system configured to cool the battery modules 8. The battery modules 8 may be provided on support faces 7 in a case 4 of the battery pack as shown in FIGS. 1a and 1b. The cooling system may be a battery pack cooling system according to any one of the above embodiments.

What is claimed is:

1. A battery pack cooling system, comprising: a cooling pipeline provided inside a battery pack, the cooling pipeline being provided with an inlet and an outlet and configured to cool a battery module;

an inlet connecting pipe, which extends into the battery pack and is connected to the inlet, and is provided with a first fool-proofing structure; and an outlet connecting pipe, which extends into the battery pack and is connected to the outlet, and is provided with a second fool-proofing structure, the second fool-proofing structure being different from the first fool-proofing structure;
wherein the first fool-proofing structure comprises a first matching member, a case of the battery pack is provided with a first assembly hole adapted to the first matching member, and the first matching member is assembled in the first assembly hole, an outer side of the first assembly hole is provided with a first cover plate and a first dust-proof pad, the first dust-proof pad being provided between the first cover plate and the first assembly hole, and the inlet connecting pipe passing through the first cover plate and the first dust-proof pad and being connected to the inlet; and
wherein the second fool-proofing structure comprises a second matching member, the case of the battery pack is provided with a second assembly hole adapted to the second matching member, and the second matching member is assembled in the second assembly hole, an outer side of the second assembly hole is provided with a second cover plate and a second dust-proof pad, the second dust-proof pad being provided between the second cover plate and the second assembly hole, and the outlet connecting pipe passing through the second cover plate and the second dust-proof pad and being connected to the outlet.

2. The cooling system according to claim 1, wherein the first matching member is fixed to an outer wall of the inlet connecting pipe and is connected to the battery pack via a fixing member; and
the second matching member is fixed to an outer wall of the outlet connecting pipe and is connected to the battery pack via a fixing member.

3. The cooling system according to claim 2, wherein a nonmetal protective pad is provided between each of the outer wall of the inlet connecting pipe and the outer wall of the outlet connecting pipe and the respective cover plate.

4. The cooling system according to claim 1, wherein the first matching member and the second matching member each comprise an oval disk and a protrusion, the protrusion being provided on a side face of the oval disk; and
positions of the protrusions of the first matching member and the second matching member on the respective oval disks are different.

5. The cooling system according to claim 1, wherein a first sealing component is provided between the first matching member and the first assembly hole; and a second sealing component is provided between the second matching member and the second assembly hole.

6. The cooling system according to claim 1, wherein one end of the inlet connecting pipe or the outlet connecting pipe is provided with a first connector, the first connector being configured to be connected to the inlet or the outlet, and the other end of each of the inlet connecting pipe and the outlet connecting pipe is provided with a second connector, an outer wall of the second connector being provided with a first rib protruding toward an outer side thereof; and
a circumferential position of the first rib on the outer wall of the second connector of the inlet connecting pipe is a first position, a circumferential position of the first rib on the outer wall of the second connector of the outlet connecting pipe is a second position; the first position and the second position are different.

7. The cooling system according to claim 6, wherein the outer wall of the second connector of each of the inlet connecting pipe and the outlet connecting pipe is further provided with a second rib; and
a circumferential position of the second rib on the outer wall of the second connector of the inlet connecting pipe is a third position, a circumferential position of the second rib on the outer wall of the second connector of the outlet connecting pipe is a fourth position, the third position and the fourth position are different.

8. The cooling system according to claim 1, wherein one end of the inlet connecting pipe is provided with a first connector, the first connector being configured to be connected to the inlet, and the other end of the inlet connecting pipe is provided with a second connector, an outer wall of the second connector being provided with a first rib protruding toward an outer side thereof.

9. The cooling system according to claim 8, wherein the outer wall of the second connector of the inlet connecting pipe is further provided with a second rib.

10. The cooling system according to claim 1, wherein one end of the outlet connecting pipe is provided with a first connector, the first connector being configured to be connected to the outlet, and the other end of the outlet connecting pipe is provided with a second connector, an outer wall of the second connector being provided with a first rib protruding toward an outer side thereof.

11. The cooling system according to claim 10, wherein the outer wall of the second connector of the outlet connecting pipe is further provided with a second rib.

12. The cooling system according to claim 1, wherein one end of the inlet connecting pipe is provided with a first connector, the first connector being configured to be connected to the inlet, and the other end of the inlet connecting pipe is provided with a second connector, an outer wall of the second connector being provided with a first rib protruding towards an outer side thereof;
one end of the outlet connecting pipe is provided with a first connector, the first connector being configured to be connected to the outlet, and the other end of the outlet connecting pipe is provided with a second connector, an outer wall of the second connector being provided with a first rib protruding towards an outer side thereof; and
a position of the first rib on one of the second connectors and a position of the first rib on the other one of the second connectors are different.

13. The cooling system according to claim 12, wherein the outer wall of the second connector of the inlet connecting pipe is further provided with a second rib, and the outer wall of the second connector of the outlet connecting pipe is further provided with a second rib; and
a position of the second rib on one of the second connectors and a position of the second rib on the other one of the second connectors are different.

14. A battery pack, comprising:
two or more battery modules; and
a cooling system configured to cool the battery modules, the cooling system comprising:
a cooling pipeline provided inside the battery pack, the cooling pipeline being provided with an inlet and an outlet and configured to cool a battery module;
an inlet connecting pipe, which extends into the battery pack and is connected to the inlet, and is provided with a first fool-proofing structure; and
an outlet connecting pipe, which extends into the battery pack and is connected to the outlet, and is provided with a second fool-proofing structure, the second fool-proofing structure being different from the first fool-proofing structure;

wherein the first fool-proofing structure comprises a first matching member, a case of the battery pack is provided with a first assembly hole adapted to the first matching member, and the first matching member is assembled in the first assembly hole, an outer side of the first assembly hole is provided with a first cover plate and a first dust-proof pad, the first dust-proof pad being provided between the first cover plate and the first assembly hole, and the inlet connecting pipe passing through the first cover plate and the first dust-proof pad and being connected to the inlet; and wherein the second fool-proofing structure comprises a second matching member, the case of the battery pack is provided with a second assembly hole adapted to the second matching member, and the second matching member is assembled in the second assembly hole, an outer side of the second assembly hole is provided with a second cover plate and a second dust-proof pad, the second dust-proof pad being provided between the second cover plate and the second assembly hole, and the outlet connecting pipe passing through the second cover plate and the second dust-proof pad and being connected to the outlet.

\* \* \* \* \*